Jan. 19, 1965    R. A. WITTREN    3,166,343
PIPE COUPLING HAVING RELEASABLE RETAINING MEANS
Original Filed Jan. 27, 1960    3 Sheets-Sheet 1
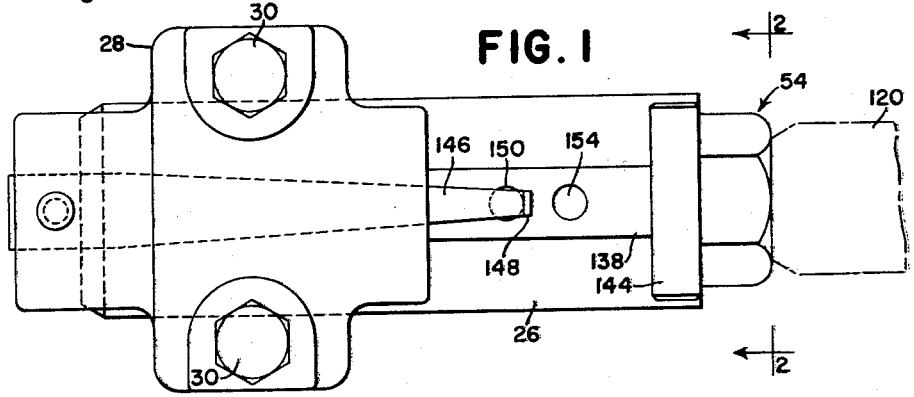
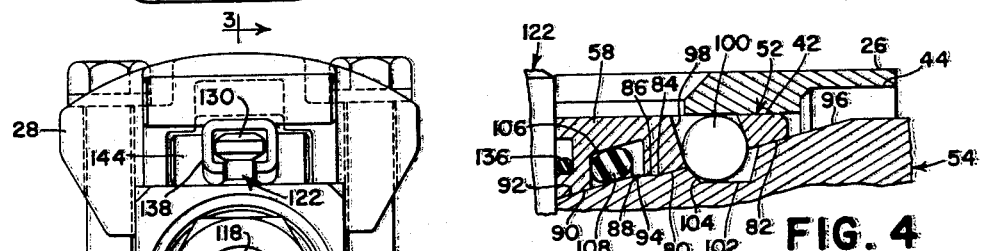
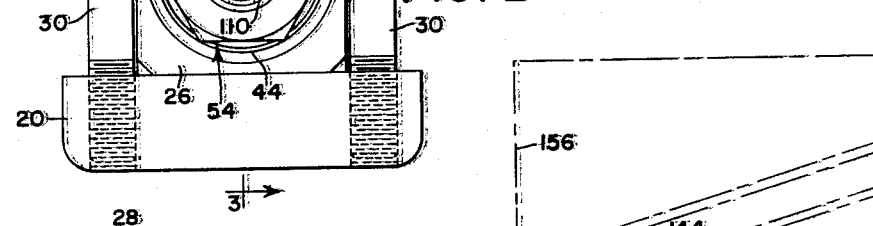
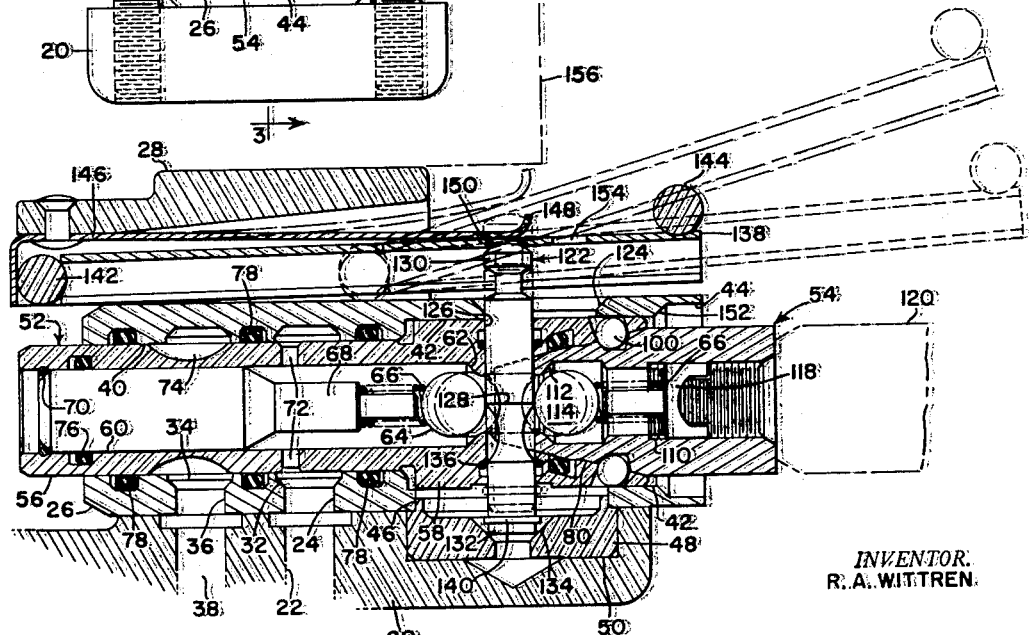
INVENTOR.
R. A. WITTREN Jan. 19, 1965     R. A. WITTREN     3,166,343
PIPE COUPLING HAVING RELEASABLE RETAINING MEANS
Original Filed Jan. 27, 1960     3 Sheets-Sheet 2
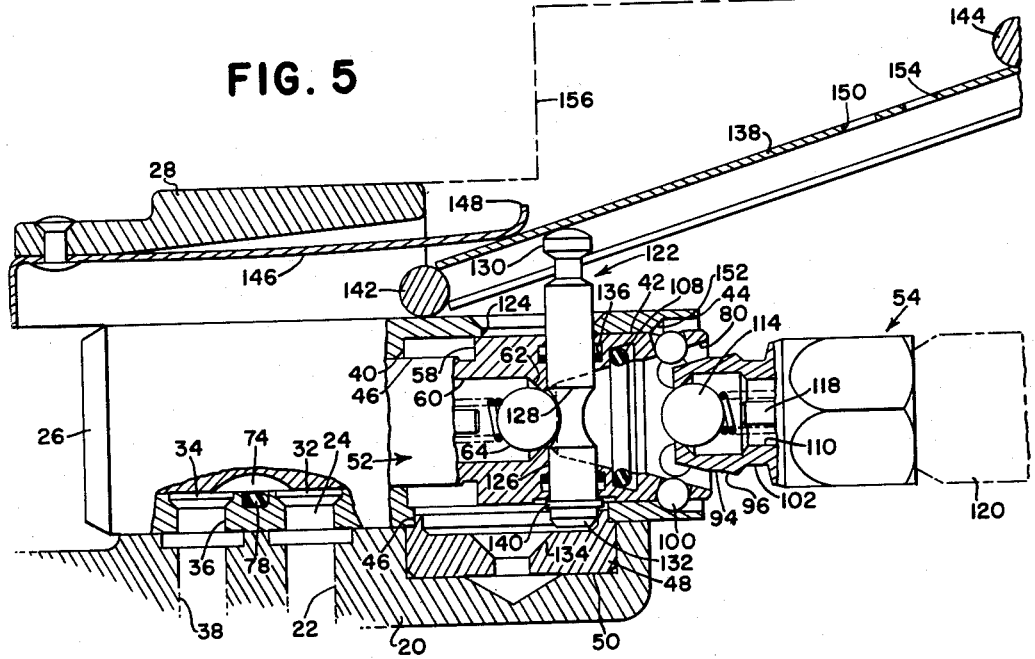
FIG. 5
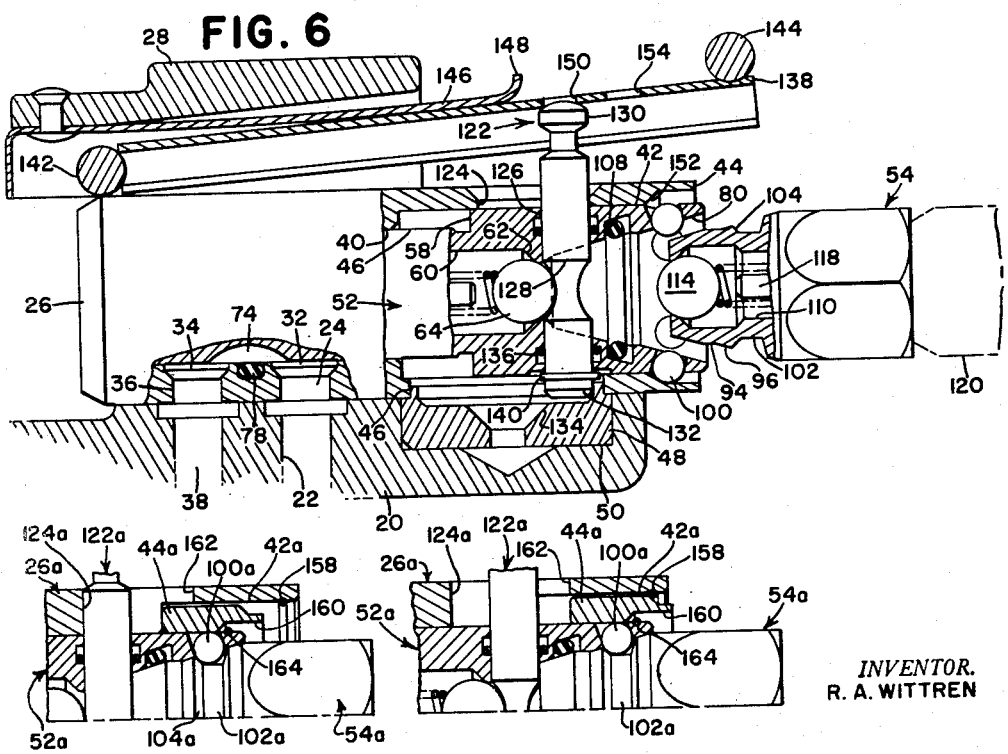
FIG. 6
FIG. 7     FIG. 8
INVENTOR.
R. A. WITTREN Jan. 19, 1965 R. A. WITTREN 3,166,343
PIPE COUPLING HAVING RELEASABLE RETAINING MEANS
Original Filed Jan. 27, 1960 3 Sheets-Sheet 3
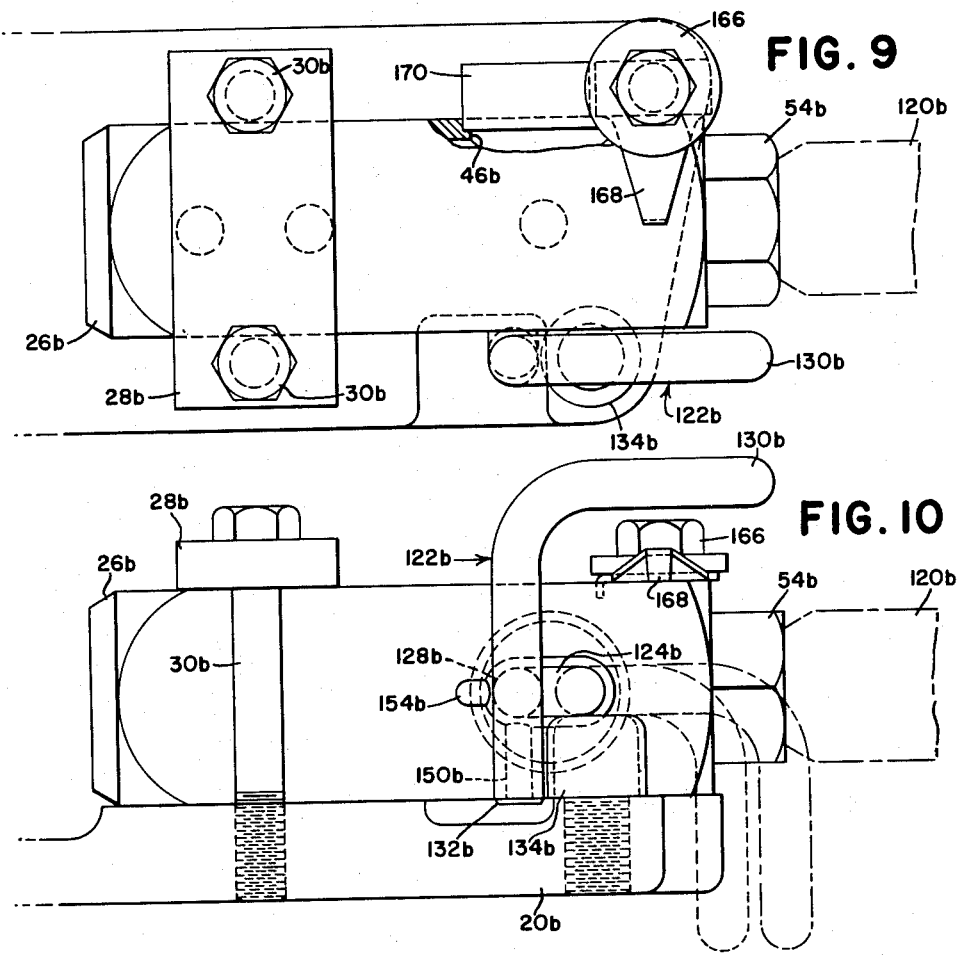
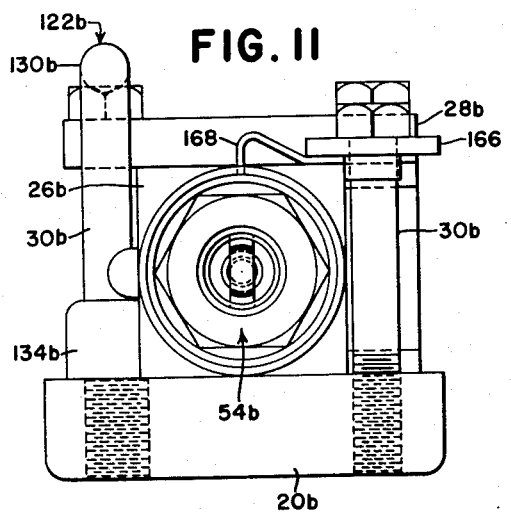
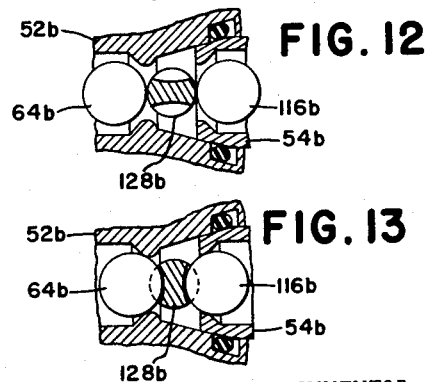
INVENTOR.
R. A. WITTREN

United States Patent Office 3,166,343
Patented Jan. 19, 1965

3,166,343
PIPE COUPLING HAVING RELEASABLE
RETAINING MEANS
Richard A. Wittren, % John Deere Tractor Research &
Engineering Center, Waterloo, Iowa
Original application Jan. 27, 1960, Ser. No. 4,930, now
Patent No. 3,130,749, dated Apr. 28, 1964. Divided
and this application Mar. 20, 1961, Ser. No. 96,878
4 Claims. (Cl. 285—1)

The invention covered by this application, which is a division of copending application Ser. No. 4,930, filed January 27, 1960, and now Patent No. 3,130,749, relates to coupling means and more particularly to fluid line coupling means of the releasable type. Still more particularly, the invention relates to such fluid line coupling assembly having valves incorporated in the coupling parts and operative automatically in response to separation of the parts to close the respective passages against loss of fluid.

Fluid line couplings of the general character referred to are well known, and most if not all of them operate on the principle that the coupling parts remain connected except when manually disconnected or subjected to a separating force tending to pull the couplings apart. The latter phase of separation is used as a safety feature in vehicular trains in which fluid units are mounted on separate vehicle units and interconnected by flexible fluid lines, the separability feature being incorporated to protect the lines against damage in the event that one vehicle unit becomes disconnected from the other. Although coupling assemblies of this character are, in the main, generally satisfactory, there remain several disadvantages involved in the initial design, in the ability of the coupling parts to be reconnected easily and in the restrictive characteristics often imposed on the parts because of the self-closing valves.

Accordingly, it is one of the important objects of the present invention to provide an improved fluid line coupling assembly eliminating such disadvantages as noted above. Particularly, it is a significant feature of the invention to provide a fluid line coupling of the self-sealing type having means for positively incurring opening and closing of the valves, both at will and automatically in response to separation of the couplings incident to the application of separating forces thereto, as involved in the disconnection of one unit from another in a vehicular train. In this respect, it should be noted that the means for positively opening and closing the valves involves reconnection of the coupling parts without influence of one valve on the other, therefore eliminating the requirement that the reconnecting force be sufficient to overcome the hydraulic force in the lines at the time. A further object resides in improved manual means for controlling the valve operating means externally of the coupling part, in which respect the invention provides as a subsidiary feature a novel operating means capable of movement between a storage position and an operating position.

Other objects of the invention reside in an improved design of the releasable means whereby impact forces are useful in facilitating release of that means, thus substantially eliminating the need for forces necessary to overcome high frictional forces encountered in couplings heretofore known. Still further objects reside in that feature of the invention involving an improved design of interfitting coupling parts enabling the coupling parts to separate or break away even though the application of separating forces may not be strictly coaxial with the coupling. In this respect, the improved design incorporates a cylindrical portion flanked by conical portions allowing a close diametrical clearance to be maintained despite tolerance variations affecting the longitudinal relationship between the coupling parts.

The foregoing and other important objects inherent in and encompassed by the invention will become apparent as preferred embodiments thereof are disclosed in the following detailed description and accompanying sheets of drawings, the several figures of which are described below.

FIG. 1 is a plan view of one form of coupling assembly.

FIG. 2 is an end view, partly in section, as seen along the line 2—2 of FIG. 1.

FIG. 3 is a longitudinal section as seen generally along the line 3—3 of FIG. 2, the view further illustrating in broken lines various positions of the valve operating mechanism and one of the coupling parts.

FIG. 4 is an enlarged fragmentary section showing the design involved in the counterbore or socket of one part and the plug or male of the other coupling part.

FIG. 5 is a section similar to FIG. 3 but illustrating manual operation of the valve means incident to release of the coupling parts.

FIG. 6 is a view similar to FIG. 5 but illustrates automatic separation of the coupling parts and incident operation of the valve operating means.

FIG. 7 is a fragmentary view showing a modified form of control of the release means between the two coupling parts, the view illustrating the coupled or connected position.

FIG. 8 is a similar view showing a condition of the coupling parts just prior to release of the releasable means.

FIG. 9 is a plan of a modified form of coupling assembly.

FIG. 10 is an elevation of the same.

FIG. 11 is an end view of the same.

FIG. 12 is a fragmentary sectional view of portions of the mating sections of the coupling parts, showing the valve operating means in a position in which it positively opens the coupling part valves.

FIG. 13 is a similar view but illustrates the other position of the valve operating means in which closing of the valves is incurred.

The present coupling designs are intended primarily for use with tractors and associated implements; although, quite obviously, the couplings and equivalents thereof may be used in other environments. Likewise, it should be noted that the use of such expressions as "front," "rear" etc. is based on convenience only and is not intended to import any limitation into the appended claims or to otherwise limit the scope or applicability of the invention.

The coupling assembly as shown in FIGS. 1–6 is mounted on a suitable support means, here represented by a housing portion 20 which may be part of a vehicle or other structure supplied with a source of fluid under pressure (not shown). As an adjunct thereto, the housing 20 is provided with a fluid pressure passage 22 which communicates with a normally registering passage 24 in a tubular coupling carrier or sleeve 26, which may be regarded as part of the support means represented by the housing 20, inasmuch as it is rigidly secured to the housing by means including a cap 28 and a pair of securing means such as cap screws 30 passed through the cap and threaded into the housing. As best seen in FIG. 2, the external configuration of the carrier or sleeve 26 is square so that it has upper and lower surfaces sandwiched between the cap 28 and housing 20 and opposite side surfaces sandwiched between the cap screws 30. Of course, any other suitable type of mounting could be used, and the particular configuration of the carrier 26 as just described is not material to the present invention.

The carrier is formed with an internal annular groove 32 in register with the port or passage 24, which is radial to the groove. An additional groove 34, spaced axially forwardly from the groove 32 is in register with a radial port or passage 36 which in turn is in register with a housing passage 38, which may lead to reservoir (not shown).

The carrier or sleeve 26 is provided with a fore-and-aft axial bore 40 which continues rearwardly from substantially the mid-point thereof as a counterbore 42 which in turn communicates at the rear end of the carrier as a second and larger counterbore 44, hereinafter sometimes referred to as a control ring for the releasable means to be subsequently described. The wall of the carrier is cut adjacent to the rear end thereof by a circular opening 46 which receives the reduced-diameter portion of a plug 48 which is in turn received by a circular recess 50 in the housing. The relationship between the plug 48 and opening 46 augments the mounting of the carrier 26 on the housing 20.

The coupling assembly includes first and second or front and rear coupling parts designated respectively in their entireties by the numerals 52 and 54. The front or female coupling part has an elongated cylindrical forward portion 56 and a larger rear cylindrical portion 58. These cylindrical portions are received respectively by the carrier bores 40 and 42. The portion 56 is axially hollow or has a fore-and-aft axial bore 60 which is reduced at its forward end to afford an annular conical valve seat 62 which is controlled by a valve ball 64 biased to close on the seat by a spring 66 carried in part by and reacting against the reduced forward portion of an interior plug 68 which is retained in the bore 60 against axial forward shifting by means such as a snap ring 70. The tubular portion 56 of the coupling part 52 is provided with a plurality of radial ports 72 which, in the position of the coupling shown in FIG. 3, are in register with the internal carrier groove 32. The radial ports communicate with that portion of the coupling part 52 ahead of its plug 68 and consequently fluid entering the radial port 72 may, at times, flow rearwardly through the coupling and past the open seat 62 if the valve ball 64 is unseated. In another position of the coupling, which will be brought out below, the pressure passage 22 is connectible to the return passage 38 in the housing 20 by fore-and-aft ports 74 in that portion of the coupling part normally in radial register with the carrier groove 34. In lieu of separate ports 74, an annular groove may be provided, which is an obvious expedient. When the coupling is in the position of FIG. 3, the port means 74 is in radial register with the carrier groove 34. In the position of the coupling shown in FIGS. 5 and 6, the port means 74 interconnects the grooves 32 and 34 in the carrier 26 and consequently interconnects the pressure and return passages 22 and 38 in the housing. This arrangement is not a material part of the present invention but is disclosed and explained as part of the environment thereof.

As will be clear without further description, except where special results are obtained, the several components of the coupling assembly are appropriately sealed with annular rings, which may be of any conventional type, as at 76 and 78.

The bore 60 in the coupling part 52 opens rearwardly beyond the valve seat 64 as what may be regarded as a stepped counterbore or rearwardly facing socket 80, the details of which may best be seen in FIG. 4, wherein it is clear that the counterbore is made up of a plurality of coaxial annular interior surfaces. The first of these is rearwardmost and is designated by the numeral 82 and comprises the section of a forwardly tapering cone. The surface extends forwardly to a circular junction line 84 with a second annular interior surface 86 comprising a section of a coaxial cylinder, the forward end of which termintes as a circle 88 which represents also the wear end of a third annular internal surface 90 comprising the section of a forwardly tapering cone. Both cones are of course regular about the common axis of the assembly and in this particular instance the elements of the two cones are parallel, providing in succession the conical, cylindrical and conical surfaces 90, 86 and 82. It will also be noted that the axial length of the cylindrical surface 86 is relatively short compared to the axial lengths of the conical surfaces 82 and 90, the reason for which will be explained below.

The coupling part 54 is capable of being forwardly axially receivable in the socket or counterbore 80 and may be rearwardly axially withdrawn from that counterbore, and for that purpose it has its forward portion shaped to match or conform with the stepped counterbore. This is also best shown in FIG. 4 (see also FIGS. 5 and 6), wherein it is apparent that the forward portion of the coupling part 54 has a forward conical external surface 92, an intermediate cylindrical surface 94 and a rear conical surface 96. When the coupling parts are connected, the counterbore surfaces 82, 86 and 90 respectively receive and mate with the surfaces 96, 94 and 92 of the coupling part 54.

The rearward portion of the coupling part 52, which contains the socket or counterbore 80, may be regarded as a portion that borders that socket, and that portion is provided with a plurality of generally radially directed openings 98, each of which receives a locking element, here in the form of a ball 100. The shape of each opening 98 is such that the ball may move freely lengthwise of the opening but may not escape from the inner portion of the opening, an expedient well known to those versed in the art and thus requiring no elaboration here. The forward portion of the coupling part 54 has recess means in the form of an annular groove 102 which, when the parts are connected (FIGS. 3 and 4), is in radial register with the balls 100 so that portions of the balls are receivable in the groove 102 while other portions of the balls are receivable in their respective openings 98. When the coupling parts are connected, the balls are confined by the internal annular surface of the counterbore 42 of the carrier, so that the balls are retained against escape or ejection radially outwardly as respects the ball-containing openings 98. However, if the coupling parts are shifted in unison rearwardly relative to the housing-confined carrier 26, the balls become radially registered with the annular control ring 44 on the carrier, previously referred to. Since the diameter of the bore in the ring 44 is larger than that of the bore 42, the balls can escape from the groove 102, being assisted outwardly by means in the groove accomplishing radial outward ejection of the balls, in respect of which the groove 102 is shaped so that a forward portion thereof constitutes an annular ramp 104. This expedient is of course broadly known and needs no special treatment here. When the coupling parts are disconnected or separated, they will occupy preliminarily such positions as shown in FIGS. 5 and 6. These positions also represent positions just prior to reconnection of the coupling parts, which is accomplished by forward insertion of the coupling part 54 into the socket 80 of the forward coupling part 52. Since the balls 100 are still in register with the control ring 44, they will be cammed outwardly until the coupling part portions 92, 94 and 96 seat in the respective counterbore portions, following which the two coupling parts will move forwardly in unison so that the balls move into the counterbore 42 to be confined thereby so as to incur the normal or connected condition of the coupling parts.

The rear portion 58 of the coupling part 52 has therein an annular groove 106 which contains a seal ring 108, which may be of any conventional type. The annular groove is located primarily in radial register with the conical surface 90 and provides an adequate seal between the coupling parts. As previously noted, the cooperating conical and cylindrical surfaces afford advantages not heretofore attainable. These are derived principally in separation of the coupling parts, which may be best understood by recognizing that in the normal coupling, rearward separation of the coupling part 54 from the coupling part 52 is at times accomplished incident to the application to the coupling part 54 of a rearward separating force. Theoretically, if the couplings are interconnected by surfaces including mating cylinders, the separating force would have to be perfectly axial. However, as a practical matter, such perfect application of forces is seldom encountered, since the units of the vehicular train are articulately interconnected and on turns and otherwise the forces may be applied at what may be regarded as adverse angles; that is, they are not axial but are at angles to an axis common to the coupling parts. The present design enables separation of the coupling parts upon the application of forces at relatively highly adverse angles, and thus is an improvement over known couplings. Moreover, the axial length of the cylindrical surfaces 86 and 94 is relatively short as compared to the axial lengths of the conical surfaces. This enables the attainment of a close diametrical clearance despite variations in axial dimension between the two coupling parts, and thus the fluid-tight characteristic of the assembled coupling is improved. The relative axial shortness of the cylindrical surfaces of course contributes to the ability of the coupling to separate or break away in response to the application of separating forces at angles to an axial line common to the coupling parts.

The coupling part has an internal axial passage or bore 110 which is shaped at its forward end to provide a coaxial conical valve seat 112 which is controlled by a valve ball 114. This ball is normally biased to close the seat by a spring 116 guided by and reacting against a threaded plug 118 of reduced cross section (see FIG. 2).

From the description thus far, it will be apparent that the two coupling parts 52 and 54 are provided respectively with passages established by the bores 60 and 110 and that these bores are normally communicable via the valve seats 62 and 112, depending upon the condition of the respective valves 64 and 114. As pointed out, these valves are normally biased to closed conditions by their respective springs 66 and 116. Now, disregarding additional structure, it will be noted that when the coupling parts are connected (FIG. 3) the balls are out of contact with each other; that is to say, the valve balls are spaced axially apart and, without more, the respective springs urge these valve balls to closed conditions as respects the respective seats. Consequently, fluid cannot flow through the coupling lines interconnected by the coupling parts. The passage 22 in the housing 20 represents the coupling line connected to the coupling part 52, and a coupling line 120, shown diagrammatically, is the line connected to the coupling part 54. For the purpose of controlling the open and closed relationships of the valve bores 64 and 114, the present invention provides valve operating means, designated in FIGS. 1–6 by the numeral 122. The details of this means will be described below.

For the purpose of carrying the valve operating means, the carrier 26 is provided with a fore-and-aft slot 124 at the side thereof diametrically opposite the opening 46 that receives the previously described plug 48. In this case, the slot 124 is at the top of the carrier. The coupling part 52 has therein a transverse bore 126 which intersects the coupling part bore rearwardly of the valve seat 62. The valve operator is in the form of a plunger which is carried by the bore 126 and which has an internal portion in the form of cam means 128, an external or upper end portion in the form of a head 130 and a lower portion 132.

The plunger 122 has two positions, one of which is shown in full lines in FIG. 3 and the other of which is shown in broken lines in the same figure. Accomplishment of these two positions results automatically or manually, the former as the result of a ramp or cam means 134 in the plug 48 and the latter by means of a handle or lever 138 cooperative with the head 130. The plunger 122 is appropriately sealed as at 136 in the opposite portions of the bore 126 and is axially shiftable along its own axis.

In one position of the plunger, as shown in full lines in FIG. 3, wherein the coupling assembly is in coupled relationship, the plunger 122 is in its down or operating position, the lower end 132 being received by the low part of the ramp means 134 and the high part of the cam means 128 (the full diameter of the plunger) being interposed between the coupling part balls 64 and 114 so as to positively hold these balls open or off their respective seats and against their respective springs 66 and 116. Thus, the coupling assembly is conditioned to transmit fluid therethrough. In the other position, shown in broken lines in FIG. 3, the plunger is in its up position, in which the low part of the cam means 128 is now in axial register with the two balls 64 and 114, thus allowing the balls to move onto their seats under action of their respective springs. The dimension of the low part of the cam means 128 is such as to allow the balls to freely seat without interference from the plunger. The positions of the plunger 122 are limited downwardly by the ramp means 134 and upwardly by the provision of a stop in the form of a snap ring 140 about the lower end 132 of the plunger.

As best seen in FIG. 2, the lever 138 is an elongated element of C-section which receives the head 130 of the plunger 132, the plunger of course being necked down as shown to be received in the slot afforded by the open underside of the lever. A transverse member 142, welded or otherwise rigidly secured to the forward end of the lever, and being formed of cylindrical section, serves as a fulcrum, while a similar member 144 at the rear end of the lever serves as a handle.

The valve operator controlling lever 138 is confined between the top surface of the carrier 26 and the undersurface of the mid-portion of the cap 28 and has a storage position as shown in full lines in FIG. 3 and an extended position as shown in dotted lines in the same figure. From the latter position, the lever may be manually moved to an operating position as shown in dot-dash lines in FIG. 3. Biasing means in the form of a spring strip 146 is rigidly secured to the underside of the cap 28 and presses downwardly on top of the lever, and the terminal rear portion of the spring is conformed as shown at 148 to engage the lever 138 via an opening 150 which, when the lever is in its storage or retracted position, also receives the upper partly spherical head 130 of the plunger 132, thus effecting a detent. In this position of the parts, the plunger 122 is pressed downwardly to its full-line position of FIG. 3, thus forcing the balls 64 and 114 apart so as to open their respective seats 62 and 112. The lower end of the plunger 122 is at this time centered in the ramp means 134 and the coupling parts are connected via the releasable means 100–102, previously described. The connected coupling parts are in their forward or normal positions relative to the carrier 26, so that the control portion established by the counterbore 42 of the carrier 26 confines the balls 100 to their locking groove 102 in the coupling part 54. Under these conditions, the forces exerted by the several components are sufficient to retain the normal or forward position of the connected coupling assembly. That is to say, the connected coupling assembly will resist rearward forces below a certain magnitude, and the parts are designed so that this magnitude is calculated to accommodate normal conditions preventing inadvertent separation of the coupling parts. However, should the connection between the vehicle units become disconnected or broken, the axial force exerted on the hose line 120, which is attached to the coupling part 54, will exert a force higher than that noted, resulting in separation of the coupling parts. The result will be that shown in FIG. 6, wherein it is clear that the rearward force exerted on the coupling assembly by tensional force applied to the hose line 120 has initially shifted the entire coupling assembly rearwardly relative to the carrier 26 which, as previously described, is rigid on the supporting housing 20. As the two coupling parts shift rearwardly in unison, the ring of balls 100 moves rearwardly relative to the counterbore 42, until they ultimately come into radial register with the control ring 44, the junction of which with the counterbore 42 is in the form of an annular seat 152 as is relatively conventional. In addition, the cam or ramp means provided by the annular surface 104 on the coupling part groove 102 tends to force the balls outwardly so that when the balls attain radial register with the control ring 44, they move outwardly and free the coupling part 54 for continued rearward movement. At the same time, the valve 114 in the coupling part 54 moves immediately to its closed position on its seat 112 by action of the spring 116. As previously described, the control balls cannot escape from the pockets or openings 98 in which they are confined in the rear end of the coupling part 52.

What is significant in the rearward movement of the coupling part is that as it so moves, the lower end 132 of the valve operating plunger 122 climbs the ramp 134, forcing the plunger upwardly to the position shown in FIG. 6, which puts the low portion of the cam 128 in axial register with the valve ball 64 in the coupling part 52, whereupon this valve can seat on its seat 62 under action of its spring 66. Thus, both coupling parts are automatically sealed against the loss of fluid. The cam means 134 thus affords an automatic mechanism whereby the valves 64 and 114 close without any direct action on either by the other.

As will be clear, the length of the slot 124 in the carrier coincides with the length of travel desired to effect not only separation of the couplings but automatic closure of the valves 64 and 114. In addition, the lower portion 132 of the plunger is limited by the annular shoulder provided on the cap 48. In short, fore-and-aft movement of the coupling part 52 is confined to the extent of travel permitted by the length of the slot 124 since, as will be seen in FIG. 3, the coupling part in its forward position results in engagement of an upper portion of the plunger 122 with the forward extremity of the slot 124.

The frictional and biasing forces overcome by rearward movement of the coupling part result from the relationship, for example, between the lower end 132 of the plunger 122 and the ramp means 134, the action of the biasing spring 146 on the lever 138, the frictional forces between the valve balls 64 and 114 and the cam means 128 and the frictional forces involved in the releasable means including the balls 100, groove 102 in the coupling part 54 and the counterbore 42 in the coupling part 52. However, not all of these forces are involved in re-coupling of the coupling parts. For example, the biasing action of the spring 146 is an assist in re-coupling. Moreover, as re-coupling is accomplished, the coupling parts move forwardly and the lower end 132 of the plunger 122 is now moving downwardly on the ramp means 134 under action of the spring 146 via the lever 138. In initial coupling, the groove 102 in the coupling part 54 first becomes radially registered with the ring of balls 100, and continued forward movement effects re-coupling in a simple and easy manner.

What is more significant, however, is the fact that the operator does not have to overcome hydraulic forces in the fluid lines. This may be best understood by noting that the balls 64 and 114, when seated, and when the plunger 122 is in the position shown in FIG. 6, are not in direct contact with each other and, as previously described, the configuration of the low portion of the cam means 128 is such that the balls are capable of seating without being forced from their seats by this low portion of the cam means. Therefore, any fluid pressure in the lines behind the balls and acting to keep the balls seated does not have to be manually overcome in the axial re-connection of the coupling part. After the parts are re-connected, the valve plunger 122 may be manually depressed by action of the lever 138 and the mechanical advantage is sufficient, particularly since the coupling parts are already connected, to readily overcome the hydraulic forces acting upon the balls 64 and 114. As a preliminary to effecting re-coupling of the coupling parts, the lever 138 may be moved forwardly from the position shown in FIG. 6 until the fulcrum 142 engages the turned-down forward end of the spring 146, in which case a second hole or opening 154 in the lever 138 will effect a detent action with the top or head of the plunger 122. As an alternate, the hole 150 may be omitted and reliance placed on friction between the lever 138 and head 130 in the original position of the coupling parts. The invention contemplates the use of the lever mechanism and its relationship to the plunger in either of the variations suggested.

Another point of note is that when the coupling is shifted rearwardly as an incident to disconnection thereof, the groove or port 74 effects a connection between the grooves 32 and 34 and thus connects the high pressure passage 22 to the return passage 38, relieving the hydraulic force behind the ball 64.

The broken-line positions in FIG. 3 and the illustration in FIG. 5 demonstrate manual operation of the valve operating plunger 122. FIG. 3 shows in full lines that the lever 138 is in its retracted or storage position. One reason for having the extended position as shown in broken lines is to enable the lever to be moved outwardly to facilitate manipulation thereof relative to overhanging structure, some of which is schematically illustrated at 156. Although, in the full line position of FIG. 3, there is a sufficient rearward portion of the lever 138 to enable the operator to lift same for moving the operator 122 upwardly, a better mechanical advantage is obtained when the lever is pulled rearwardly, the fulcrum 142 sliding along the top surface of the carrier 26 and the lever being guided, of course, by the relationship between its C-section and the neck below the head 130. Specifically, the lever is drawn rearwardly to the dotted line position, where it is clear of the overhanging structure 156, at least in the immediate vicinity of the rear portion of the cap 28. In this position, the valve operator is not disturbed and of course is in its position in which it is holding the balls 64 and 114 off their respective seats. The operator may then lift the rear end of the lever, with the fulcrum 142 bearing on the top surface of the carrier 26, achieving the position of FIG. 5 if, at the same time, the operator also manually moves the coupling parts rearwardly, in which case he has to overcome the force between the lower end 132 of the operator 122 and the ramp means 134. However, the lever 138 affords an expedient for eliminating the necessity of overcoming this force, since lifting the lever raises the plunger and consequently the only remaining force necessary to be overcome is frictional force resulting from sliding surfaces, particularly between the coupling and carrier 26, which is negligible, and that developed in the locking means 100–102. At the same time, the balls are caused to seat and the coupling parts are sealed against the loss of fluid.

The dot-dash lines in FIG. 3 illustrate operation of the valve means 64–144 without effecting uncoupling of the parts, as when it is desired to close the passages without separation of the coupling parts. In short, the coupling operates in a simple and expedient manner, and may be separated either automatically or manually. In either case, an incident to separation is shifting of the coupling parts in unison from a forward position to a rearward position. When the shifting occurs as a result of tensional forces applied to the hose line 120, for example, the valve operator 122 operates automatically to incur closing of the valves 64 and 114. When the manipulation is manual, the valve operator is operated by hand via the lever 138 to accomplish the same result. A distinction between manual and automatic operation arises because of the necessity for ease of manual disconnection, in which case the lever 138 serves as means for removing the force incident to the relationship between the operator 122 and ramp 134, as pointed out above. Likewise, reconnection is facilitated because, as already outlined, the operator does not have to overcome hydraulic forces behind the balls 64 and 114.

FIGS. 7 and 8 show a modification in which connection and reconnection is further facilitated. In these figures, a modified form of design of the coupling parts and carrier is illustrated and, for the purpose of relating this design to that already described, similar reference characters with the suffix "a" will be employed. Thus, there is shown a carrier 26a, a coupling part 52a and a coupling part 54a. The carrier is provided with a slot 124a which accommodates a valve operator 122a just as before. The relationship between the coupling parts, so far as concerns the releasable means, is primarily the same, to the extent that the rear end of the coupling part 52a carries a ring of balls or lock elements 100a and the coupling part has a ball-receiving groove 102a. However, an important distinction occurs over the structure previously described, in that the carrier 26a has a counter bore 42a enlarged over that previously described so as to accommodate a control ring or retainer 44a which here, as distinguished from the control ring 44 previously described, is not a part of the carrier but rather is a separate ring functioning to retain the balls 100a when the coupling parts are connected (FIG. 7). Thus, radially outwardly operating forces resulting from the balls 100a, as tended to be ramped out by ramp 104a on the coupling part groove 102a, as the parts are attempted to be separated, act directly on the ring 44a rather than on the counterbore 42a and the high forces present in FIGS. 1-6 are not present in the modified structure. This may be best understood when it is noted that in FIGS. 1-6 the balls 100 act directly against the counterbore 42 and thus develop high frictional forces as the coupling parts move rearwardly relative to the carrier. In FIGS. 7 and 8, these forces are exerted against the ring 44a which, as will be readily seen, is of a smaller outside diameter than the inside diameter of the counterbore 42a. Thus, as the coupling parts 52a and 54a move rearwardly incident to separation thereof, the ring 44a moves in unison therewith. Release is effected by interrupting rearward travel of the ring 44a as the coupling parts 52a and 54a continue. This is accomplished by stop means, here in the form of a snap ring 158 carried at the terminal rear end of the counterbore 42a. Thus, as the coupling parts and ring move rearwardly in unison to a point short of releasing condition, the snap ring 158 engages the ring 44a and stops its travel. The inner diameter of the ring 44a is provided with a counterbore 160 which has the same function as the control ring 44 in FIGS. 1-6; that is to say, it accommodates radial outward movement of the balls 100a and the couplings become disconnected. FIG. 8 shows the condition of the parts when the ring 44a is interrupted by the snap ring 158, from which it will be seen that further rearward travel of the coupling parts 52a and 54a will occur relative to the stopped or interrupted control ring 44a, the balls 100a then escaping into the counterbore 160 of the control ring. This may be further appreciated by noting that the limiting action set up between the operator 122a and slot 124a in the carrier 26a is not complete, since the operator 122a has a distance to go rearwardly before it engages the rear extremity of the slot which, for convenience, is designated here at 162. The advantage of this design is that as the coupling parts and control ring move rearwardly and the control ring is then suddenly interrupted, an impact force is derived which results from the rearward inertia of the moving coupling parts. In other words, the three parts 52a, 54a and 44a travel in unison and the movement of the one part (44a) is interrupted so that the other two continue. This is particularly an advantage in manual disconnection of the coupling parts.

When reconnection is to be effected, the coupling part 54a is inserted into the coupling part 52a and the two move forwardly together. In this condition, a snap ring 164 on the rear terminal end of the coupling part 52a engages the control ring 44a and moves it forwardly to its original position. In this respect, FIG. 8 may be regarded as a position preliminary to complete reconnection of the parts, noting, again, that the operator 122a is substantially midway between the front and rear ends of the slot 124a. In all other respects, the valve operation and relationship between the coupling parts, so far as concerns the novel design of the counterbore and forward end of the coupling part 54 (54a) are the same as described above.

FIGS. 9-13 show a modified form of arrangement in which a different valve control means is used. However, the basic concept is the same and the same or similar coupling parts and carrier may be used. Therefore, in the interests of clarity, reference numerals previously employed will be used but will bear the suffix "b."

The supporting means for the modified form of arrangement is represented by a housing 20b having passages (not shown) which may be the same as those previously described. The housing mounts a carrier 26b similar to the carrier 26, except in this case the carrier 26b is rotated 90° from the carrier 26 so that the opening and slot corresponding respectively to those at 46 and 124 in FIGS. 1-6 are at the opposite sides of the carrier, designated here, respectively, at 46b and 124b. The carrier 26b is retained in place by a clamp 28b and cap screws 30b. If desired, additional mounting means may be employed at the rear end of the carrier, such as that shown generally at 166. This means has a tang 168 which serves to locate the carrier in initial assembly. FIGS. 12 and 13 show, fragmentarily, sectional portions of cooperative coupling parts 52b and 54b, which may be identical to those previously described. These coupling parts respectively have self-sealing balls 64b and 116b, and the coupling part 54b may be used to connect a fluid line 120b. It will be clear, without further description, that other details may be exactly as previously described and that the coupling parts occupy the same relationship to the carrier 26b as do the coupling parts 52 and 54 relative to the carrier 26.

A valve operator 122b has an internal portion 128b and an external portion 130b, here in the form of a handle. The handle is of L-shape and has a lower portion 132b which is cooperative with cam means 134b carried by the housing 20b. The cam in this case is a headed member screwed into an appropriate aperture in the housing 20b, which will be obvious without elaboration. The internal portion 128b is in the form of a cross shaft welded or otherwise rigidly secured externally to the operating handle 130b and this shaft portion extends transversely between the spaced apart balls 64b and 116b (FIGS. 12 and 13) passing at one side through the slot 124b and being accommodated at the other side by the opening 46b, which is here shown as being closed by a cap 170. This, however, is an incident to the use of the same type of carrier as the carrier 26 and, in other constructions, the details would be different. Nevertheless, the slot 124b accommodates the operator 122b as it moves fore and aft when the coupling parts shift in unison in the carrier 26b, the internal portion 128b of the operator having the same relationship to the coupling 52b as that between the operator 122 and coupling part 52.

When the coupling parts are in their normal forward or operating position, the operator handle 130b is in the position shown, in which position it is retained by a detent action accomplished between a slot 150b formed in one side of the carrier 126b, in cooperation with the cylindrical section of the lower portion 132b of the operator. This portion 132b of the operator is against the forward face of the cam means 134b. The internal portion 128b is in the form of cam means represented in FIGS. 12 and 13 and, in the FIG. 10 position of the parts, the portion 128b is in the position of FIG. 12, in which the high portions of the cam means operate to forcibly unseat the balls 64b and 116b. When it is desired to release the coupling parts manually, the operator turns the lever or valve operating means 122b to the position shown in dotted lines. This causes the interior portion 128b to assume the position of FIG. 13, in which the low portions of the cam means are now presented to the balls 64b and 116b, whereby the balls may close under action of their springs (not shown). The operator may then separate the coupling parts 52b and 54b in the manner described in connection with FIGS. 1–6; that is, he merely pulls rearwardly on the coupling part 54b to overcome the forces involved in the releasable locking means, which may be the same as that described at 100–102. In reconnection, the coupling part 54b is inserted forwardly into the coupling part 52b and again the operator need not overcome hydraulic forces in the lines, since the position of the internal portion 128b of the operator 122b will accommodate the balls (FIG. 13) and the operator need move the entire coupling assembly forwardly relative to the carrier 26b. In this position, the two coupling parts are interconnected by the releasable means and the operator 122b may now be turned to the full line position of FIG. 10, which achieves the position of FIG. 12 for the internal portion 128b, thus opening the balls 64b and 116b.

In the case of automatic operation, the two coupling parts move rearwardly relative to the carrier 26b. Since the operator 122b is carried by the coupling part 52b, it will move rearwardly with the coupling parts. As it does so, the lower portion 132b thereof will be engaged by the cam 134b and continued movement of the coupling parts in unison causes the operator to not only shift rearwardly but also to turn to the dot-dash line position illustrated, thus automatically achieving the position of FIG. 13 for the internal portion 128b and incurring closing of the valve balls 64b and 116b. A further slotted portion 154b is provided in the same side of the carrier 26b as the slot or recess 150b, which serves as a detent for retaining the dot-dash position of the operator 122b. An axial spring load (not shown) is imparted to the internal portion of the operator so as to accommodate the detent action at 150b and 154b. Reconnection of the coupling parts following automatic separation proceeds as described above. That is, the coupling part 54b is inserted into the coupling part 52b and the two are moved forwardly in unison. As the parts move forwardly, the operator 122, being now at the rear end of the slot 124b, will also be carried forwardly so that when the forward position of the connected coupling parts is achieved, the operator 122b may be readily returned to its full-line position. In other respects, the characteristics of the coupling are similar to those previously described, which will readily occur on the basis of the present disclosure.

Features and advantages not categorically enumerated herein will readily occur to those versed in the art, as will many modifications and alterations in the preferred embodiments of the invention disclosed here, all of which may be achieved without departure from the spirit and scope of the invention.

What is claimed is:

1. A fluid line coupling assembly, comprising: male and female coupling parts connectible and disconnectible by relative movement along a straight-line path, said female part having a pocket at one end opening along said path and a portion bordering said pocket provided with an opening transverse to said path, said male part adapted to be received in and withdrawn from said pocket along said path to respectively achieve connected and disconnected conditions of said parts, said male part having a recess therein transverse to said path and adapted to register with the opening when the parts are connected; a lock element normally received in part in the opening and in part in the registered recess and movable transverse to said path for escape from the recess and into the opening to free the parts for disconnection; a retainer mounted for movement along said path between a first position blocking said opening and engaging the element to confine said element against escape from the recess when the parts are connected and a second position unblocking said opening and freeing the element for such escape to enable disconnection of the parts; support means mounting the two parts, when connected, for movement in unison along said path in response to a separating force tending to withdraw the male part from the female part; means on one part operative upon movement of said parts in unison to apply to the element a transverse force urging said element into such tighter engagement with the retainer as to cause the retainer to move along with said parts and relative to the support means; and stop means on the support means operative, after limited travel of said parts and retainer in unison, to engage said retainer so that continued travel of said parts in unison causes relative shifting of the retainer to its second position so as to enable escape of the element from the recess whereby the parts become disconnected.

2. In combination: support means; a first coupling part movable back and forth on the support means between normal and releasing positions and having a socket facing in the direction of the releasing position, said part further having a portion bordering the socket and provided with an opening transverse to said socket; a second coupling part having a portion receivable in the socket by insertion toward the aforesaid normal position and removable from said socket in the opposite direction, said second part portion having a recess therein registrable with said opening when received in the socket; a lock element received in part by the opening and in part by said recess to lock the coupling parts together and adapted to radially escape from the recess and into the opening to release the parts for disconnection; a retainer axially shiftable relative to said support means and to the coupling parts between a first position blocking the opening and engaging the element to prevent escape of the element when the parts are connected and a second position unblocking said opening to free the element for escape from said recess; means on one part operative in response to a separating force applied to the second coupling part in the direction of the aforesaid releasing position to force the element in the direction of escape from the recess and into tighter engagement with the retainer and thus to create a frictional force between the element and the retainer sufficient to shift the retainer along with the parts and relative to the support means toward the releasing position; and means on the support means and engageable with the retainer after predetermined movement of said parts and retainer in unison for interrupting movement of the retainer so that said parts continue to move relative to the engaged retainer and thus effecting unblocking of the opening for enabling escape of the element and disconnection of the coupling parts.

3. A fluid line coupling assembly, comprising: a first coupling part having front and rear ends and a fore-and-aft axial bore terminating at said rear end in a counterbore including a first coaxial annular interior surface adjacent to said rear end and comprising a section of a first forwardly tapering regular cone truncated in a plane normal to the assembly axis, a second coaxial annular interior surface next forwardly of said first surface and comprising a section of a cylinder having a rear circular junction with said first surface at said truncating plane, and a third coaxial annular interior surface meeting the forward portion of said second surface at a front circular junction spaced axially forwardly of and of the same diameter as said rear junction and said third surface tapering forwardly therefrom as the section of a second regular cone whose elements are parallel to and radially outwardly of those of the first cone extended, said second surface being of relatively short axial length as compared to the other two surfaces; a second coupling part coaxially forwardly receivable by and rearwardly separable from the counterbore and having a forward portion provided with successive coaxial cone-section, cylinder-section and cone-section exterior surfaces respectively matching and interfitting with said interior surfaces; and releasable means including elements respectively in the first interior surface of the first part and the cone-section exterior surface of the second part that matches said first interior surface and normally holding said parts together against separating forces tending to pull the second part rearwardly out of said counterbore.

4. The invention defined in claim 3, in which: the third interior surface has an annular groove therein and a seal ring in said groove.

References Cited in the file of this patent

UNITED STATES PATENTS

| | | |
|---|---|---|
| 2,255,334 | Scheiwer | Sept. 9, 1941 |
| 2,386,270 | Samiran | Oct. 9, 1945 |
| 2,452,430 | Clark | Oct. 26, 1948 |
| 2,536,702 | Scheiwer | Jan. 2, 1951 |
| 2,552,543 | Earle | May 15, 1951 |
| 2,666,656 | Bruning | Jan. 19, 1954 |
| 2,699,961 | Omon | Jan. 18, 1955 |
| 2,788,243 | Goodliffe | Apr. 9, 1957 |
| 2,860,893 | Clark | Nov. 18, 1958 |
| 2,930,633 | Ethington | Mar. 29, 1960 |
| 3,052,488 | Bruning | Sept. 4, 1962 |

FOREIGN PATENTS

| | | |
|---|---|---|
| 30,682 | Switzerland | Jan. 28, 1904 |

UNITED STATES PATENT OFFICE
CERTIFICATE OF CORRECTION

Patent No. 3,166,343                      January 19, 1965

Richard A. Wittren

It is hereby certified that error appears in the above numbered patent requiring correction and that the said Letters Patent should read as corrected below.

In the grant, lines 1 to 3, for "Richard A. Wittren, of Waterloo, Iowa," read -- Richard A. Wittren, of Waterloo, Iowa, assignor to Deere & Company, of Moline, Illinois, a corporation of Delaware, --; line 12, for "Richard A. Wittren, his heirs" read -- Deere & Company, it successors --; in the heading to the printed specification, lines 4 and 5, for "Richard A. Wittren, % John Deere Tractor Research & Engineering Center, Waterloo, Iowa" read -- Richard A. Wittren, Waterloo, Iowa, assignor to Deere & Company, Moline, Ill., a corporation of Delaware --.

Signed and sealed this 1st day of June 1965.

(SEAL)
Attest:

ERNEST W. SWIDER                      EDWARD J. BRENNER
Attesting Officer                 Commissioner of Patents